(12) United States Patent
Iida et al.

(10) Patent No.: US 11,001,528 B2
(45) Date of Patent: May 11, 2021

(54) CORROSION-RESISTANT MEMBER

(71) Applicant: KYOCERA CORPORATION, Kyoto (JP)

(72) Inventors: Shuichi Iida, Satsumasendai (JP); Mizuho Oota, Satsumasendai (JP); Satoshi Toyoda, Kirishima (JP); Hidehiro Takenoshita, Satsumasendai (JP)

(73) Assignee: KYOCERA Corporation, Kyoto (JP)

( * ) Notice: Subject to any disclaimer, the term of this patent is extended or adjusted under 35 U.S.C. 154(b) by 1 day.

(21) Appl. No.: 16/473,259

(22) PCT Filed: Dec. 26, 2017

(86) PCT No.: PCT/JP2017/046550
§ 371 (c)(1),
(2) Date: Jun. 25, 2019

(87) PCT Pub. No.: WO2018/124024
PCT Pub. Date: Jul. 5, 2018

(65) Prior Publication Data
US 2020/0148596 A1    May 14, 2020

(30) Foreign Application Priority Data
Dec. 26, 2016  (JP) .............................. JP2016-251282

(51) Int. Cl.
*C04B 35/117*  (2006.01)
*C04B 111/26*  (2006.01)

(52) U.S. Cl.
CPC ........ *C04B 35/117* (2013.01); *C01P 2002/72* (2013.01); *C01P 2004/61* (2013.01); *C01P 2004/62* (2013.01); *C04B 2111/26* (2013.01); *C04B 2235/3222* (2013.01)

(58) Field of Classification Search
CPC .............................. C04B 35/111; C04B 35/117
See application file for complete search history.

(56) References Cited

U.S. PATENT DOCUMENTS

| 7,091,146 B2 * | 8/2006 | Okiyama .............. C04B 35/117 501/128 |
| 8,899,564 B2 * | 12/2014 | Suzuki .................... G03F 7/707 269/21 |
| 2004/0266606 A1 * | 12/2004 | Okiyama .............. C04B 35/117 501/128 |

(Continued)

FOREIGN PATENT DOCUMENTS

| JP | H07507527 A | 8/1995 |
| JP | 2014047119 A * | 3/2014 |
| WO | 9325465 A1 | 12/1993 |

*Primary Examiner* — Karl E Group
(74) *Attorney, Agent, or Firm* — Viering, Jentschura & Partner MBB

(57) ABSTRACT

A corrosion-resistant member may include alumina ceramics containing α-alumina and anorthite. The alumina ceramics may contain 0.4% by mass or more of Ca and Si in total in terms of CaO and SiO$_2$, respectively, and a mass ratio of CaO/SiO$_2$ may fall within a range of 0.5 to 2. Moreover, a ratio B/A of X-ray diffraction peak intensity B for (004) plane of the anorthite to X-ray diffraction peak intensity A for (104) plane of the α-alumina in a surface of the alumina ceramics, may be 0.01 or more.

12 Claims, 1 Drawing Sheet

(56) References Cited

U.S. PATENT DOCUMENTS

2011/0077141 A1* 3/2011 Walker .................. C04B 35/111
501/32
2012/0193878 A1* 8/2012 Suzuki ................. B65G 49/061
279/3

* cited by examiner

CORROSION-RESISTANT MEMBER

CROSS-REFERENCE TO RELATED APPLICATIONS

This application is a national stage entry according to 35 U.S.C. 371 of International Application No. PCT/JP2017/046550 filed on Dec. 26, 2017, which claims priority to Japanese Patent Application No. 2016-251282 filed on Dec. 26, 2016, the contents of which are entirely incorporated herein by reference.

TECHNICAL FIELD

The present disclosure relates to a corrosion-resistant member.

BACKGROUND

There is an increase in demand for liquid beverage supply systems, typified by vending machines, that provide a beverage such as juice drink poured in a paper cup or the like. In such a liquid beverage supply system, a constituent member that is exposed to an undiluted beverage syrup concentrate is required to be highly resistant to corrosion by the syrup concentrate to withstand years of use.

As a material of such a constituent member (hereafter referred to as "corrosion-resistant member"), ceramics having excellent resistance to corrosion may be adopted (refer to Japanese Unexamined Patent Publication JP-A 7-507527 (1995) (Patent Literature 1), for example). In particular, among the ceramics, alumina ceramics which is inexpensive may be easily adopted.

SUMMARY

A corrosion-resistant member according to a non-limiting aspect of the disclosure may include alumina ceramics containing α-alumina and anorthite. The alumina ceramics may contain 0.4% by mass or more of Ca and Si in total in terms of CaO and $SiO_2$, respectively, and a mass ratio of $CaO/SiO_2$ may fall within a range of 0.5 to 2. Moreover, a ratio B/A of X-ray diffraction peak intensity B for (004) plane of the anorthite to X-ray diffraction peak intensity A for (104) plane of the α-alumina in a surface of the alumina ceramics, may be 0.01 or more.

DETAILED DESCRIPTION

To produce alumina ceramics, in the interests of the lowering of sintering temperature, strength enhancement, etc., a sintering aid such as silicon oxide ($SiO_2$), calcium carbonate ($CaCO_3$), or magnesium carbonate ($MgCO_3$) is used. Following the completion of a firing process, the sintering aid remains as a glass phase in an alumina grain boundary.

Some undiluted beverage syrup concentrates are strongly acid and have a pH of 2 to 3. When alumina ceramics is exposed to such a strongly-acidic syrup concentrate having a pH of 2 to 3, constituent elements present in the glass phase may be dissolved out by the syrup, causing unpalatableness or change in flavor or taste in a beverage.

Reduction in the amount of glass phase-forming sintering aids and execution of a sintering process at high firing temperature make possible production of a constituent member made of high-purity alumina ceramics. Unfortunately, due to its expensiveness, high-purity alumina ceramics does not lend itself to practical application to a corrosion-resistant member which is exposed to an undiluted beverage syrup concentrate.

This has created the need for a corrosion-resistant member that, while being made of alumina ceramics which can be produced at a relatively low cost through a relatively low-temperature firing process using a sintering aid, is resistant to dissolution of constituent elements even when exposed to a strongly-acidic syrup concentrate.

Figure 1:
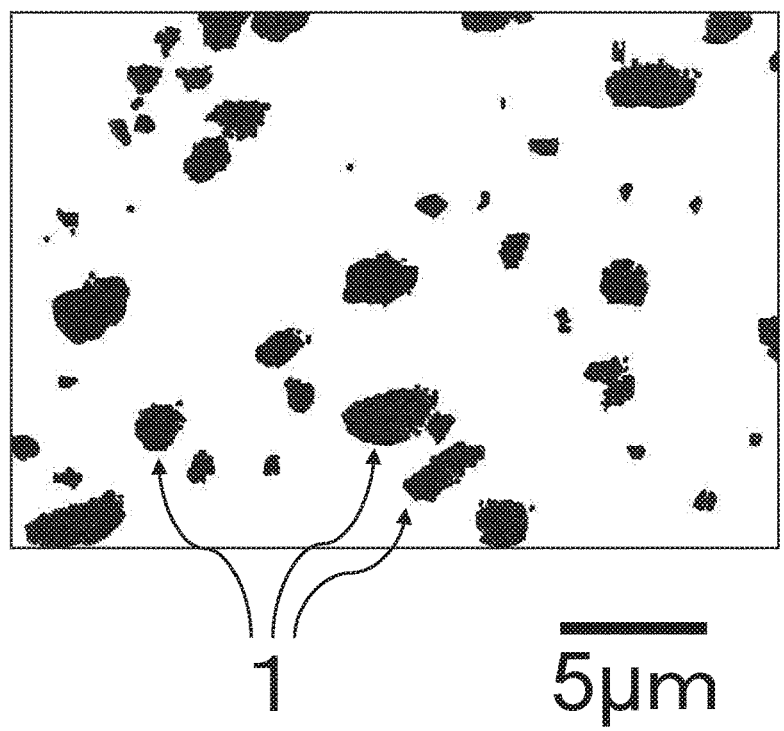
FIG. 1 is a view showing an image of a surface of a corrosion-resistant member according to a non-limiting aspect of the disclosure taken by Electron Probe Microanalyzer (EPMA)
Figure 2:
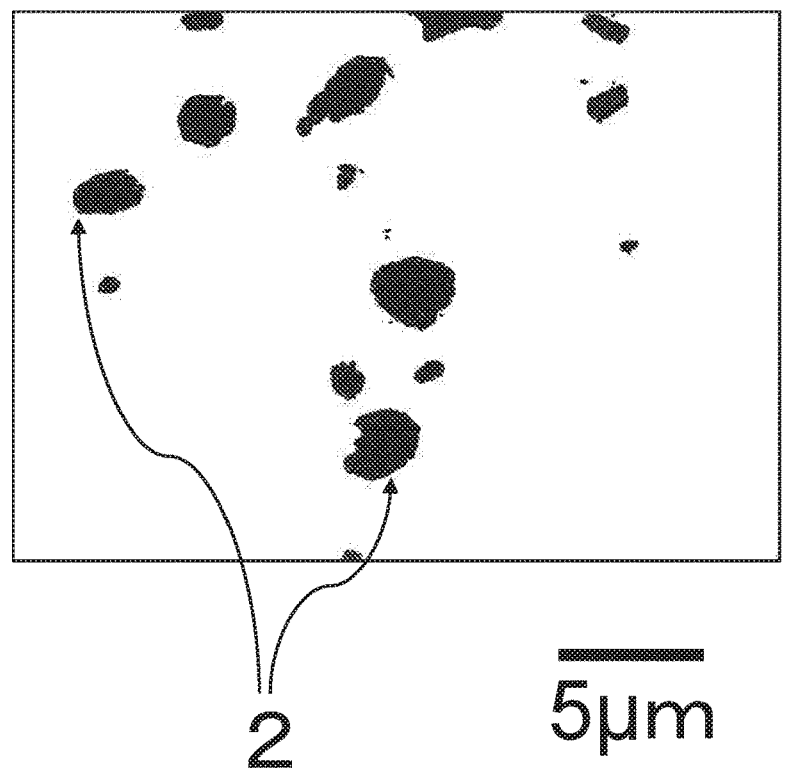
FIG. 2 is a view showing another image of the surface of the corrosion-resistant member according to a non-limiting aspect of the disclosure taken by EPMA.

A corrosion-resistant member according to a non-limiting aspect of the disclosure is resistant to dissolution of constituent elements even when exposed to a strongly-acidic syrup concentrate. The following describes the details of the corrosion-resistant member according to a non-limiting aspect of the disclosure with reference to drawings. FIGS. 1 and 2 are views each showing an image of the surface of the corrosion-resistant member according to a non-limiting aspect of the disclosure taken by Electron Probe Microanalyzer (EPMA). Black spot-looking areas shown in FIG. 1 correspond to anorthite (indicate the existence of anorthite), whereas black spot-looking areas shown in FIG. 2 correspond to magnesium aluminate (indicate the existence of magnesium aluminate).

The corrosion-resistant member according to a non-limiting aspect of the disclosure includes alumina ceramics containing α-alumina (α-$Al_2O_3$) and anorthite ($CaAl_2Si_2O_8$). Alumina ceramics is a material having 96.8% by mass or more of Al in terms of $Al_2O_3$ based on 100% by mass of all components constituting the ceramics.

The alumina ceramics constituting the corrosion-resistant member according to a non-limiting aspect of the disclosure contains 0.4% by mass or more of Ca and Si in total in terms of CaO and $SiO_2$, respectively, and a mass ratio of $CaO/SiO_2$ falls within the range of 0.5 to 2. That is, the corrosion-resistant member according to a non-limiting aspect of the disclosure, containing 0.4% by mass or more of Ca and Si in total in terms of CaO and $SiO_2$, respectively, exhibits excellent mechanical characteristics. Moreover, the corrosion-resistant member according to a non-limiting aspect of the disclosure, having a mass ratio of $CaO/SiO_2$ within the range of 0.5 to 2, exhibits high resistance to corrosion.

The corrosion-resistant member according to a non-limiting aspect of the disclosure, when it contains 3.2% by mass or less of Ca and Si in total in terms of CaO and $SiO_2$, respectively, exhibits high mechanical strength while maintaining high resistance to wear.

The content of Al in terms of $Al_2O_3$, the content of Ca in terms of CaO, and the content of Si in terms of $SiO_2$ in the corrosion-resistant member according to a non-limiting aspect of the disclosure are determined by calculation in the following manner. First, measurement on the corrosion-resistant member is performed using an X-ray fluorescence analyzer (XRF) or a High-frequency inductively-coupled plasma emission spectrometer (ICP-AES) to determine the content of each element. Then, the measured content of each element may be converted into the content of corresponding oxide. For example, the content of Al determined by measurement using the XRF or ICP-AES may be converted into the content of $Al_2O_3$.

Moreover, in the corrosion-resistant member according to a non-limiting aspect of the disclosure, the ratio B/A of X-ray diffraction peak intensity B for (004) plane of anorthite (observed at 2θ= about 28° in X-ray diffraction measurement using Cu-Kα radiation) to X-ray diffraction peak intensity A for (104) plane of α-alumina (observed at 2θ= about 35° in X-ray diffraction measurement using Cu-Kα radiation) in a surface of the alumina ceramics, is 0.01 or more. The "surface" means an exposed surface.

In the corrosion-resistant member according to a non-limiting aspect of the disclosure that fulfills the above condition, many of Ca and Si elements, which are prone to being dissolved out by a strongly-acidic syrup concentrate when used singly, are present in the form of dissolution-resistant anorthite in the surface of the member. That is, the corrosion-resistant member according to a non-limiting aspect of the disclosure incurs little dissolution of Ca and Si when exposed to a strongly-acidic syrup concentrate, and thus causes little unpalatableness or change in flavor or taste in a beverage. The corrosion-resistant member according to a non-limiting aspect of the disclosure with little dissolution of Ca and Si maintains its mechanical characteristics such as resistance to wear for a longer period of time, and thus lends itself to application to a valve member of a beverage supply system.

In the case where 0.4% by mass or more of Ca and Si are contained in total in terms of CaO and $SiO_2$, respectively, but the ratio B/A in the surface is less than 0.01, anorthite is not formed. As a consequence, Ca and Si tend to be dissolved out through the surface on exposure to a strongly-acidic syrup concentrate.

Moreover, in the corrosion-resistant member according to a non-limiting aspect of the disclosure, the ratio B/A in the surface may fall within the range of 0.03 or more and 0.1 or less. With the fulfillment of this condition, the corrosion-resistant member according to a non-limiting aspect of the disclosure exhibits greater mechanical strength while maintaining its corrosion resistance.

Moreover, in the corrosion-resistant member according to a non-limiting aspect of the disclosure, the ratio B/A in the interior of the alumina ceramics may be smaller than the ratio B/A in the surface. The term "interior" refers to an area at a depth greater than or equal to 0.2 mm below the surface. With the fulfillment of this condition, the corrosion-resistant member according to a non-limiting aspect of the disclosure exhibits greater mechanical strength while maintaining its corrosion resistance.

Moreover, in the corrosion-resistant member according to a non-limiting aspect of the disclosure, the ratio B/A in the interior may be 0.02 or more smaller than the ratio B/A in the surface. With the fulfillment of this condition, the corrosion-resistant member according to a non-limiting aspect of the disclosure exhibits even greater mechanical strength while maintaining its corrosion resistance.

Moreover, in the corrosion-resistant member according to a non-limiting aspect of the disclosure, the mean value of equivalent circular diameter in anorthite present in the surface may fall within the range of 0.2 μm or more and 2 μm or less. The term "equivalent circular diameter" refers to the diameter of a circle which is the equivalent of the area of anorthite. With the fulfillment of this condition, the corrosion resistance can be maintained. Moreover, anorthite is less prone to development of an origin of cracking, with a consequent improvement in mechanical strength.

The mean value of equivalent circular diameter in anorthite present in the surface is determined by calculation in the following manner. First, surface analysis is performed on the surface of the corrosion-resistant member according to a non-limiting aspect of the disclosure with EPMA. A crystal particle which has been found to have a relatively high content of Ca and Si as compared with surrounding particles, as well as to bear Al and O, by observation with color mapping in the surface analysis, is identified as anorthite.

Next, as shown in FIG. 1, anorthite appearing in an image taken by EPMA is solidly shaded. This image is subjected to image analysis in accordance with the particle analytical method applied to Image Analysis Software "AZO-KUN" (registered trademark) manufactured by Asahi Kasei Engineering Corporation (in what follows, the term "Image Analysis Software "AZO-KUN"" refers to the image analysis software manufactured by Asahi Kasei Engineering Corporation throughout the description). As to the conditions specified in the analysis using "AZO-KUN", for example, crystal particle brightness is set at "low", image binarization mode is set at "automatic", and shading function is set at "ON". Then, calculation is performed to derive the mean value of all the equivalent circular diameter data of individual anorthite particles obtained from the particle analysis.

Moreover, the alumina ceramics constituting the corrosion-resistant member according to a non-limiting aspect of the disclosure further contains magnesium aluminate (spinel: $MgAl_2O_4$). A ratio C/A of X-ray diffraction peak intensity C for (311) plane of magnesium aluminate (observed at 2θ= about 37° in X-ray diffraction measurement using Cu-Kα radiation) to X-ray diffraction peak intensity A for (104) plane of α-alumina in the surface of alumina ceramics may fall within the range of 0.01 or more and 0.10 or less. With the fulfillment of this condition, the corrosion-resistant member exhibits greater corrosion resistance. This is owing to magnesium aluminate being superior in corrosion resistance to α-alumina.

Moreover, in the corrosion-resistant member according to a non-limiting aspect of the disclosure, the mean value of equivalent circular diameter in magnesium aluminate present in the surface may fall within the range of 0.3 μm or more and 4 μm or less. With the fulfillment of this condition, magnesium aluminate present in the surface is conducive to high corrosion resistance, and, magnesium aluminate is less prone to exfoliation. This makes it possible to maintain the corrosion resistance of the corrosion-resistant member for longer period of time.

The mean value of equivalent circular diameter in magnesium aluminate present in the surface is determined by calculation in the following manner. First, surface analysis is performed on the surface of the corrosion-resistant member according to a non-limiting aspect of the disclosure with EPMA. A crystal particle which has been found to have a relatively low content of Al as compared with surrounding particles, as well as to bear Mg and O, by observation with color mapping in the surface analysis, is identified as magnesium aluminate.

Next, as shown in FIG. 2, magnesium aluminate appearing in an image taken by EPMA is solidly shaded. With use of this image, the mean value of equivalent circular diameter in magnesium aluminate is calculated with a method similar to the earlier described method to determine the equivalent circular diameter of anorthite.

Moreover, in the corrosion-resistant member according to a non-limiting aspect of the disclosure, as a trace element, for example, iron oxide ($Fe_2O_3$), zirconium oxide ($ZrO_2$), titanium oxide ($TiO_2$), chromium oxide ($Cr_2O_3$), or yttrium oxide ($Y_2O_3$) may be contained in an amount of 0.2% by mass or less based on 100% by mass of all components constituting the corrosion resistant member.

The following describes a method for manufacturing the corrosion-resistant member according to a non-limiting aspect of the disclosure by way of example.

First, α-alumina (α-$Al_2O_3$) powder, calcium carbonate ($CaCO_3$) powder, and silicon oxide ($SiO_2$) powder whose average particle sizes determined by a laser diffraction and scattering technique each fall within a range of 2 μm to 5 μm, are prepared.

Next, a powder mixture is obtained by weighing a predetermined amount of each powder so that the content of the α-alumina powder falls within the range of 96.8 to 99.6% by mass, the content of the calcium carbonate powder falls within the range of 0.2 to 1.6% by mass in terms of CaO, and the content of the silicon oxide powder falls within the range of 0.2 to 1.6% by mass in terms of $SiO_2$.

Next, a slurry is obtained by putting the powder mixture, a solvent in an amount of 100 parts by mass based on 100 parts by mass of the powder mixture, and a dispersant in an amount of 0.1 to 0.5 part by mass based on 100 parts by mass of the powder mixture in a ball mill, then mixing these materials together, and then performing pulverization until a predetermined average particle size is reached. Next, after a 3 to 8 parts by mass of a binder, such as PEG (polyethylene glycol), is added to the slurry, the binder and the slurry are mixed together to obtain a slurry which is subjected to a spray drying process. This slurry is spray-dried into granules with a spray dryer.

The granules are subsequently molded into a predetermined form by means of powder press-molding or otherwise, and, cutting work is performed on an as-needed basis to obtain a molded body. Next, the molded body is fired in the atmosphere at temperatures ranging from 1500° C. to 1600° C. while being retained for 2 to 12 hours to obtain a sintered compact.

The sintered compact thus obtained is heat-treated by being retained in the atmosphere at temperatures ranging from 1100° C. to 1300° C. for 1 to 10 hours. With the heat treatment under the above-described conditions, anorthite is produced in an α-alumina grain boundary. At this time, the ratio B/A of X-ray diffraction peak intensity B for (004) plane of anorthite to X-ray diffraction peak intensity A for (104) plane of α-alumina in the surface of alumina ceramics, is 0.01 or more. This allows the corrosion-resistant member according to a non-limiting aspect of the disclosure to be obtained.

Moreover, in order for the ratio B/A in the surface to fall within the range of 0.03 or more and 0.1 or less, in the manufacturing method thus far described, suitable changes are made to the compositional ratio of each powder in the preparation of the powder mixture, as well as to the conditions set for the heat treatment.

Moreover, in order for the ratio B/A in the interior of alumina ceramics to be smaller than the ratio B/A in the surface, in the above-described manufacturing method, two heat treatments are performed at different times. More specifically, the obtained sintered compact is heat-treated by being retained in the atmosphere at temperatures ranging from 1420° C. to 1480° C. for 2 to 11 hours, and is thereafter heat-treated further by being retained in the atmosphere at temperatures ranging from 1100° C. to 1300° C. for 1 to 10 hours.

Moreover, in order for the ratio B/A in the interior to be 0.02 or more smaller than the ratio B/A in the surface, while two heat treatments are performed at different times in the manufacturing method as described above, the duration of retention time in the first heat treatment is set at four or more hours.

Moreover, in order for the mean value of equivalent circular diameter in anorthite present in the surface to fall within the range of 0.2 μm or more and 2 μm or less, in the slurry-forming process in the above-described manufacturing method, pulverization is carried out until the value of average particle size falls within the range of 0.6 μm to 1.1 μm.

Moreover, in order to obtain the magnesium aluminate-containing corrosion-resistant member, in the powder mixture-preparing process in the above-described manufacturing method, in addition to the α-alumina powder, the calcium carbonate powder, and the silicon oxide powder, magnesium carbonate ($MgCO_3$) powder whose average particle size falls within 2 μm to 5 μm is prepared. Then, a powder mixture is obtained by weighing a predetermined amount of each powder so that the content of the α-alumina powder falls within the range of 96.8% to 99.4% by mass, the content of the calcium carbonate powder falls within the range of 0.2% to 1.6% by mass in terms of CaO, the content of the silicon oxide powder falls within the range of 0.2% to 1.6% by mass in terms of $SiO_2$, and the content of the magnesium carbonate powder falls within the range of 0.2% to 1.5% by mass in terms of MgO. Thus, there is obtained the magnesium aluminate-containing corrosion-resistant member in which the ratio of X-ray diffraction peak intensity C for (311) plane of magnesium aluminate to X-ray diffraction peak intensity A for (104) plane of α-alumina in the surface of alumina ceramics falls within the range of 0.01 or more and 0.10 or less.

The following specifically describes examples according to a non-limiting aspect of the disclosure, but it will be appreciated that the non-limiting embodiment of the disclosure is not limited to the following examples.

Example 1

To begin with, predetermined amounts of prepared α-alumina powder, calcium carbonate powder, and silicon oxide powder were weighed out to obtain a powder mixture.

Next, a slurry was obtained by putting the powder mixture, 100 parts by mass of a solvent based on 100 parts by mass of the powder mixture, and 0.2 parts by mass of a dispersant based on 100 parts by mass of the powder mixture in a ball mill, then mixing these materials together, and then performing pulverization until the value of average particle size reached 1.3 μm. After that, with the addition of 2 parts by mass of a PEG solution on a solid-content basis, 1 part by mass of a PVA (polyvinyl alcohol) solution on a solid-content basis, and 1 part by mass of an acrylic resin solution on a solid-content basis, the slurry and these solutions were mixed together to obtain a slurry which is subjected to a spray drying process. This slurry was spray-dried into granules with a spray dryer.

Then, the granules were molded by the powder press-molding method to obtain a molded body which was about 35 mm in length, about 35 mm in width, and about 2.5 mm in thickness. The molded body was fired in the atmosphere at a temperature of 1550° C. while being retained for 5 hours to obtain a sintered compact. The sintered compact is about 28 mm in length, about 28 mm in width, and about 2 mm in thickness. This sintered compact was used as Sample No. 1.

Sample Nos. 2 through 8 were subsequently obtained by heat-treating sintered compacts in the atmosphere at a temperature as shown in Table 1 under retention time of 5 hours.

Next, the samples were each tested for resistance to corrosion. Each sample was soaked in a syrup for carbonated soft drinks (pH 2.2 in undiluted form, solution amount: 100 ml) for 72 hours. The mass of the sample was measured before and after the soaking process. A decrease in mass as observed after the soaking process is expressed in percentage (%). A decrease in mass (%) was determined by utilizing the formula of $\{(W2-W1)/W1\} \times 100(\%)$, wherein W1 denotes the mass of a yet-to-be-soaked sample and W2 denotes the mass of a sample which has undergone soaking. That is, a negative value (%) obtained by calculation indicates that the mass was reduced. Moreover, following the completion of the soaking process, the content of Ca and the content of Si in the syrup were measured by ICP-AES. The amount of dissolution was expressed as part per million (ppm).

The crystal phase in the surface of each sample was examined with an X-ray diffractometer (XRD) in the same manner as described previously. Cu-Kα radiation was adopted in XRD measurement. The result was that, in Sample Nos. 1 through 7, the peak (maximum intensity) for (104) plane of α-alumina appeared at a diffraction angle (2θ) of about 35.2°, and, in Sample Nos. 2 through 7, the peak (maximum intensity) for (004) plane of anorthite appeared at a diffraction angle (2θ) of about 27.9°. Sample No. 1 showed no sign of the peak (maximum intensity) for (004) plane of anorthite.

Next, the ratio B/A of X-ray diffraction peak intensity B for (004) plane of anorthite to X-ray diffraction peak intensity A for (104) plane of α-alumina in the surface, was calculated. Note that, in calculating the B/A, the X-ray diffraction peak intensities A and B used an intensity including a background of each peak.

Moreover, the samples were subjected to ICP-AES measurement. The result was that each and every sample was found to have 99.0% by mass of Al in terms of $Al_2O_3$, 0.5% by mass of Ca in terms of CaO, and 0.5% by mass of Si in terms of $SiO_2$.

The result of measurement is shown in Table 1.

TABLE 1

| Sample No. | Heat-treatment temperature (° C.) | B/A | Corrosion resistance | | |
|---|---|---|---|---|---|
| | | | Decrease in mass (%) | Ca dissolution amount (ppm) | Si dissolution amount (ppm) |
| 1 | No heat treatment | 0 | −0.046 | 480 | 300 |
| 2 | 1000 | <0.01 | −0.024 | 273 | 77 |
| 3 | 1100 | 0.01 | −0.009 | 98 | 28 |
| 4 | 1130 | 0.03 | −0.007 | 77 | 21 |
| 5 | 1150 | 0.04 | −0.007 | 78 | 22 |
| 6 | 1200 | 0.08 | −0.006 | 69 | 20 |
| 7 | 1300 | 0.10 | −0.007 | 79 | 24 |
| 8 | 1400 | <0.01 | −0.035 | 400 | 150 |

As seen from Table 1, a decrease in mass in each of Sample Nos. 3 through 7 was found to be only −0.006% to −0.009%.

Example 2

Predetermined amounts of prepared α-alumina powder, calcium carbonate powder, and silicon oxide powder were weighed out to obtain powder mixtures for formation of samples having different compositions as shown in Table 2.

Next, a slurry was obtained by putting each powder mixture, 100 parts by mass of a solvent based on 100 parts by mass of the powder mixture, and 0.2 parts by mass of a dispersant based on 100 parts by mass of the powder mixture in a ball mill, then mixing these materials together, and then performing pulverization until the value of average particle size reached 1.3 μm. After that, with the addition of 2 parts by mass of a PEG solution on a solid-content basis, 1 part by mass of a PVA solution on a solid-content basis, and 1 part by mass of an acrylic resin solution on a solid-content basis, the slurry and these solutions were mixed together to obtain a slurry which is subjected to a spray drying process. This slurry was spray-dried into granules with a spray dryer.

Then, the granules were molded by the powder press-molding method to obtain a molded body A which was about 35 mm in length, about 35 mm in width, and about 2.5 mm in thickness, and an annular molded body B which was about 14.4 mm in outside diameter, about 10.5 mm in inside diameter, and about 1.8 mm in length. The molded bodies A and B were fired in the atmosphere at a temperature of 1550° C. while being retained for 5 hours to obtain a sintered compact A and a sintered compact B. The sintered compact A was about 28 mm in length, about 28 mm in width, and about 2 mm in thickness. The sintered compact B was about 12 mm in outside diameter, about 8.8 mm in inside diameter, and about 1.5 mm in length.

Next, the sintered compacts A and B were heat-treated by being retained in the atmosphere at a temperature of 1200° C. for 5 hours to obtain different samples. Sample No. 18 is identical with Sample No. 6 of Example 1. The sintered compact A was used to form a sample which was subjected to anticorrosion test and XRD analysis. On the other hand, the sintered compact B was used to form a sample which was subjected to radial crushing strength measurement.

Next, the samples were each tested for resistance to corrosion in the same way as in Example 1.

Moreover, the crystal phase in the surface of each sample was examined in the same way as in Example 1 to determine the ratio B/A in the surface. The result was that, in Sample Nos. 11 through 14 and 17 through 33, the peak (maximum intensity) for (004) plane of anorthite appeared at a diffraction angle (2θ) of about 27.90. Sample Nos. 9, 10, 15, and 16 showed no sign of the peak (maximum intensity) for (004) plane of anorthite.

Moreover, Sample Nos. 11, 17 through 19, and 24 were subjected to radial crushing strength measurement. The radial crushing strength of each sample was determined on the basis of the measured value of a load at which each of the obtained samples was crushed under a load applied to the sample from its outer periphery.

The result of measurement is shown in Table 2.

TABLE 2

| Sample No. | CaO content (% by mass) | SiO$_2$ content (% by mass) | Al$_2$O$_3$ content (% by mass) | CaO/SiO$_2$ | B/A | Corrosion resistance | | | Radial crushing strength (N) |
| --- | --- | --- | --- | --- | --- | --- | --- | --- | --- |
| | | | | | | Decrease in mass (%) | Ca dissolution amount (ppm) | Si dissolution amount (ppm) | |
| 9 | 0.0 | 0.2 | 99.8 | 0.00 | 0 | −0.012 | 0 | 112 | — |
| 10 | 0.2 | 0.0 | 99.8 | — | 0 | −0.012 | 114 | 0 | — |
| 11 | 0.2 | 0.2 | 99.6 | 1.00 | 0.01 | −0.005 | 69 | 20 | 187 |
| 12 | 0.2 | 0.4 | 99.4 | 0.50 | 0.02 | −0.006 | 25 | 71 | — |
| 13 | 0.2 | 0.5 | 99.3 | 0.40 | 0.02 | −0.009 | 39 | 110 | — |
| 14 | 0.5 | 0.2 | 99.3 | 2.50 | 0.03 | −0.009 | 105 | 55 | — |
| 15 | 0.0 | 1.0 | 99.0 | 0.00 | 0 | −0.053 | 0 | 644 | — |
| 16 | 1.0 | 0.0 | 99.0 | — | 0 | −0.059 | 710 | 0 | — |
| 17 | 0.3 | 0.3 | 99.2 | 1.00 | 0.03 | −0.006 | 72 | 23 | 205 |
| 18 | 0.5 | 0.5 | 99.0 | 1.00 | 0.08 | −0.006 | 69 | 20 | 203 |
| 19 | 0.6 | 0.6 | 98.8 | 1.00 | 0.1 | −0.006 | 73 | 21 | 200 |
| 20 | 1.0 | 0.4 | 98.6 | 2.50 | 0.04 | −0.036 | 229 | 27 | — |
| 21 | 0.5 | 1.0 | 98.5 | 0.50 | 0.08 | −0.007 | 29 | 83 | — |
| 22 | 1.0 | 0.5 | 98.5 | 2.00 | 0.08 | −0.009 | 78 | 32 | — |
| 23 | 1.5 | 1.0 | 97.5 | 1.50 | 0.09 | −0.008 | 74 | 25 | — |
| 24 | 1.4 | 1.4 | 97.2 | 1.00 | 0.12 | −0.006 | 55 | 24 | 184 |
| 25 | 2.0 | 0.9 | 97.1 | 2.22 | 0.07 | −0.053 | 469 | 170 | — |
| 26 | 1.0 | 2.0 | 97.0 | 0.50 | 0.12 | −0.007 | 35 | 74 | — |
| 27 | 1.0 | 2.2 | 96.8 | 0.45 | 0.08 | −0.038 | 81 | 225 | — |
| 28 | 1.4 | 1.8 | 96.8 | 0.78 | 0.15 | −0.008 | 25 | 78 | — |
| 29 | 2.0 | 1.2 | 96.8 | 1.67 | 0.13 | −0.007 | 88 | 28 | — |
| 30 | 1.2 | 2.0 | 96.8 | 0.60 | 0.20 | −0.008 | 22 | 70 | — |
| 31 | 1.6 | 1.8 | 96.6 | 0.89 | 0.21 | −0.010 | 71 | 32 | — |
| 32 | 1.5 | 2.5 | 96.0 | 0.60 | 0.22 | −0.009 | 36 | 96 | — |
| 33 | 2.5 | 1.5 | 96.0 | 1.67 | 0.16 | −0.011 | 95 | 44 | — |

As seen from Table 2, a decrease in mass in each of Sample Nos. 11, 12, 17, 18, 19, 21 through 24, 26, and 28 through 33 was found to be only −0.005% to −0.011%. The measurement tests resulted in the discovery that excellent resistance to corrosion was attained when fulfilling the following conditions: 0.4% by mass or more of Ca and Si were contained in total in terms of CaO and SiO$_2$, respectively, and the mass ratio CaO/SiO$_2$ fell within the range of 0.5 to 2; and the ratio B/A in the surface is 0.01 or more.

Moreover, of Sample Nos. 11, 17 through 19, and 24 in each of which the mass ratio CaO/SiO$_2$ stood at 1.0, Sample Nos. 17 through 19 were found to have high radial crushing strength of 200 N or greater. The measurement tests resulted in the discovery that greater mechanical strength was attained when fulfilling the following condition: the ratio B/A in the surface fell within the range of 0.03 or more and 0.1 or less.

Example 3

There were prepared samples that differ from one another in A/B in the surface and A/B in the interior. These samples were each evaluated for radial crushing strength. Each sample was produced basically in the same method as that used to form Sample No. 18 of Example 2, except that two heat treatments were performed at different times, and more specifically, after performing the first heat treatment in the atmosphere at a temperature of 1450° C. under retention time as shown in Table 3, the second heat treatment was performed in the atmosphere at a temperature of 1200° C. under retention time of 5 hours. Sample No. 34 is identical with Sample No. 18 of Example 2.

Moreover, the crystal phase in the surface of each sample was examined in the same way as in Example 1 to determine the ratio B/A in the surface. Likewise, the crystal phase in the interior of each sample was examined to determine the ratio B/A in the interior.

The radial crushing strength of each sample was measured in the same way as in Example 2.

The result of measurement is shown in Table 3.

TABLE 3

| Sample No. | Retention time (hour) | B/A | | Radial crushing strength (N) |
| --- | --- | --- | --- | --- |
| | | Surface | Interior | |
| 34 | No retention | 0.08 | 0.08 | 203 |
| 35 | 2 | 0.08 | 0.07 | 210 |
| 36 | 4 | 0.08 | 0.06 | 217 |
| 37 | 6 | 0.08 | 0.02 | 217 |
| 38 | 8 | 0.08 | 0.01 | 218 |
| 39 | 10 | 0.08 | 0 | 218 |

As seen from Table 3, Sample Nos. 35 through 39 were found to have high radial crushing strength of 210 N or greater. The measurement tests resulted in the discovery that even greater mechanical strength was attained when fulfilling the following condition: the ratio B/A in the interior is smaller than the ratio B/A in the surface.

Moreover, Sample Nos. 36 through 39 of Sample Nos. 35 through 39 were found to have high radial crushing strength of 217 N or greater. The measurement tests resulted in the discovery that even greater mechanical strength was attained when fulfilling the following condition: the ratio B/A in the interior is 0.02 or more smaller than the ratio B/A in the surface.

Example 4

There were prepared samples that differ from one another in the mean value of equivalent circular diameter in anorthite present in the surface. These samples were each evaluated for radial crushing strength. Each sample was produced basically in the same method as that used to form Sample No. 37 of Example 3, except that pulverization was performed until corresponding one of average particle size values as shown in Table 4 was reached in a slurry-forming process. Sample No. 40 is identical with Sample No. 37 of Example 3.

Then, the mean value of equivalent circular diameter in anorthite present in the surface of each sample was determined by calculation in the following manner. To begin with, surface analysis was performed on the surface of each sample with EPMA. A crystal particle which was found to have a relatively high content of Ca and Si as compared with surrounding particles, as well as to bear Al and O, by observation with color mapping in the surface analysis, was identified as anorthite.

Next, anorthite appearing in an image taken by EPMA was solidly shaded. This image was subjected to image analysis in accordance with the particle analytical method applied to Image Analysis Software "AZO-KUN". As to the conditions specified in the analysis using "AZO-KUN", crystal particle brightness was set at "low", image binarization mode was set at "automatic", and shading function was set at "ON". Then, calculation was performed to derive the mean value of all the equivalent circular diameter data of individual anorthite particles obtained from the particle analysis.

Moreover, the radial crushing strength of each sample was measured in the same way as in Example 2.

The result of measurement is shown in Table 4.

TABLE 4

| Sample No. | Average particle size of slurry (μM) | Mean value of equivalent circular diameter in anorthite (μM) | Radial crushing strength (N) |
| --- | --- | --- | --- |
| 40 | 1.3 | 2.6 | 217 |
| 41 | 1.1 | 2 | 225 |
| 42 | 0.8 | 0.3 | 230 |
| 43 | 0.7 | 0.2 | 231 |
| 44 | 0.6 | 0.2 | 231 |

As seen from Table 4, Sample Nos. 41 through 44 were found to have high radial crushing strength of 225 N or greater. The measurement tests resulted in the discovery that greater mechanical strength was attained when fulfilling the following condition: the mean value of equivalent circular diameter in anorthite present in the surface falls within the range of 0.2 μm or more and 2 μm or less.

Example 5

Moreover, samples were produced basically in the same method as that used to form Sample No. 18 of Example 2, except that, with the preparation of magnesium carbonate ($MgCO_3$) powder, predetermined amounts of the above-described powdery materials (α-alumina powder, calcium carbonate powder, and silicon oxide powder) and the magnesium carbonate powder were weighed out to obtain powder mixtures for formation of samples having different compositions as shown in Table 5. Sample No. 45 is identical with Sample No. 18 of Example 2.

Next, the samples were each tested for resistance to corrosion in the same way as in Example 1.

Moreover, the crystal phase in the surface of each sample was examined with the XRD in the same manner as described earlier. The result was that, in Sample Nos. 45 through 56, the peak (maximum intensity) for (104) plane of α-alumina appeared at a diffraction angle (2θ) of about 35.2°.

Moreover, in Sample Nos. 46 through 50 and 52 through 56, the peak (maximum intensity) for (311) plane of magnesium aluminate appeared at a diffraction angle (2θ) of about 36.90.

Next, the ratio C/A of X-ray diffraction peak intensity C for (311) plane of magnesium aluminate to X-ray diffraction peak intensity A for (104) plane of α-alumina, was calculated. Note that, in calculating the C/A, the X-ray diffraction peak intensities A and C used an intensity including a background of each peak.

The result of measurement is shown in Table 5.

TABLE 5

| Sample No. | CaO content (% by mass) | $SiO_2$ content (% by mass) | MgO conten (% by mass) | $Al_2O_3$ content (% by mass) | C/A | Decrease in mass (%) |
| --- | --- | --- | --- | --- | --- | --- |
| 45 | 0.5 | 0.5 | 0.0 | 99.0 | 0.00 | −0.006 |
| 46 | 0.5 | 0.5 | 0.1 | 98.9 | <0.01 | −0.006 |
| 47 | 0.5 | 0.5 | 0.2 | 98.8 | 0.01 | −0.003 |
| 48 | 0.5 | 0.5 | 0.8 | 98.2 | 0.07 | −0.002 |
| 49 | 0.5 | 0.5 | 1.4 | 97.6 | 0.08 | −0.003 |
| 50 | 0.5 | 0.5 | 1.5 | 97.5 | 0.10 | −0.004 |
| 51 | 0.8 | 0.8 | 0.0 | 98.4 | 0.00 | −0.008 |
| 52 | 0.8 | 0.8 | 0.1 | 98.3 | <0.01 | −0.008 |
| 53 | 0.8 | 0.8 | 0.2 | 98.2 | 0.01 | −0.004 |
| 54 | 0.8 | 0.8 | 0.8 | 97.6 | 0.07 | −0.002 |
| 55 | 0.8 | 0.8 | 1.4 | 97.0 | 0.08 | −0.003 |
| 56 | 0.8 | 0.8 | 1.5 | 96.9 | 0.10 | −0.003 |

As seen from Table 5, a decrease in mass in each of Sample Nos. 47 through 50 and 53 through 56 was found to be only −0.002% to −0.004%. The measurement tests resulted in the discovery that greater resistance to corrosion was attained when fulfilling the following condition: the ratio C/A in the surface fell within the range of 0.01 or more and 0.10 or less.

REFERENCE SIGNS LIST

1: Anorthite
2: Magnesium aluminate

What is claimed is:

1. A corrosion-resistant valve member,
the corrosion-resistant valve member comprising a material that comprises alumina ceramics,
the alumina ceramics comprising α-alumina and anorthite,
the alumina ceramics further comprising 0.4% by mass or more of Ca and Si in total in terms of CaO and $SiO_2$, a mass ratio of $CaO/SiO_2$ falling within a range of 0.5 to 2, and
a ratio B/A of X-ray diffraction peak intensity B for plane (004) of the anorthite to X-ray diffraction peak intensity A for plane (104) of the α-alumina in a surface of the alumina ceramics being 0.01 or more.

2. The corrosion-resistant valve member according to claim 1, wherein
the ratio B/A in the surface falls within a range of 0.03 or more and 0.1 or less.

3. The corrosion-resistant valve member according to claim 2, wherein
a ratio B/A in an interior of the alumina ceramics is smaller than the ratio B/A in the surface.

4. The corrosion-resistant valve member according to claim 3, wherein
the ratio B/A in the interior is 0.02 or more smaller than the ratio B/A in the surface.

5. The corrosion-resistant valve member according to claim 1, wherein
a mean value of equivalent circular diameter in the anorthite present in the surface falls within a range of 0.2 μm or more and 2 μm or less.

6. The corrosion-resistant valve member according to claim 1, wherein
the alumina ceramics further comprises magnesium aluminate, and
in the surface of the alumina ceramics, a ratio of X-ray diffraction peak intensity C for plane (311) of the magnesium aluminate to the X-ray diffraction peak intensity A for plane (104) of the α-alumina falls within a range of 0.01 or more and 0.10 or less.

7. A beverage supply system comprising:
a corrosion-resistant valve member,
the corrosion-resistant valve member comprising a material that comprises alumina ceramics,
the alumina ceramics comprising α-alumina and anorthite,
the alumina ceramics comprising 0.4% by mass or more of Ca and Si in total in terms of CaO and $SiO_2$, a mass ratio of $CaO/SiO_2$ falling within a range of 0.5 to 2, and
a ratio B/A of X-ray diffraction peak intensity B for plane (004) of the anorthite to X-ray diffraction peak intensity A for plane (104) of the α-alumina in a surface of the alumina ceramics being 0.01 or more.

8. The beverage supply system according to claim 7, wherein
the ratio B/A in the surface falls within a range of 0.03 or more and 0.1 or less.

9. The beverage supply system according to claim 8, wherein
a ratio B/A in an interior of the alumina ceramics is smaller than the ratio B/A in the surface.

10. The beverage supply system according to claim 9, wherein
the ratio B/A in the interior is 0.02 or more smaller than the ratio B/A in the surface.

11. The beverage supply system according to claim 7, wherein
a mean value of equivalent circular diameter in the anorthite present in the surface falls within a range of 0.2 μm or more and 2 μm or less.

12. The beverage supply system according to claim 7, wherein
the alumina ceramics further comprises magnesium aluminate, and
in the surface of the alumina ceramics, a ratio of X-ray diffraction peak intensity C for plane (311) of the magnesium aluminate to the X-ray diffraction peak intensity A for plane (104) of the α-alumina falls within a range of 0.01 or more and 0.10 or less.

* * * * *